June 26, 1934.  H. P. HOOD  1,964,321
METAL VAPOR LAMP
Filed Jan. 16, 1933

INVENTOR.
HARRISON P. HOOD
BY Dorsey & Cole
ATTORNEYS.

Patented June 26, 1934

1,964,321

UNITED STATES PATENT OFFICE 1,964,321

METAL VAPOR LAMP

Harrison P. Hood, Corning, N. Y., assignor to Corning Glass Works, Corning, N. Y., a corporation of New York Application January 16, 1933, Serial No. 652,068

12 Claims. (Cl. 176—122)

This invention relates to alkali metal-vapor lamps and has for its object to prevent the discoloration or blackening which occurs on the interior of the envelopes of such lamps during operation and which thereby decreases their efficiency.

The light yield of alkali metal-vapor lamps and particularly of the sodium-vapor lamp is unusually high and therefore lamps of this type are desirable sources of illumination. However such lamps deteriorate rapidly in use due to the attack of the alkali-metal vapors on the glass tube or envelope enclosing the lamp with the result that a discoloring film is formed on the inside surface thereof. This film which varies in color from amber to black has been attributed to the formation of metallic silicon by reduction of the silica of the glass. Hence it was at first thought that in order to avoid this difficulty the glass from which the envelopes were made should be substantially free from silica, although it was recognized that the lowering of the silica content seriously decreased the stability of the glass. More recently it has been shown that glasses containing silica are suitable for alkali metal-vapor lamps provided that the silica content is less than 50% and the boric oxide content is more than 30%. However, such glasses are relatively unstable and in making lamps therefrom it was found necessary to provide them with an outer coating or layer of highly stable glass in order to give them the desired stability. Furthermore prior glasses containing little or no silica do not provide a large range of expansion coefficients, a consideration which is often of much importance in the manufacture of vapor arc lamps.

I have now discovered that certain borosilicate glasses containing over 50% of silica and less than 30% of boric oxide are better than prior glasses in that they not only resist blackening practically as well as prior glasses but are sufficiently stable to resist weathering and hence do not require protective means. Moreover they possess a relatively wide range of expansion coefficients.

In general, my invention comprises an alkali metal vapor lamp the glass tube or envelope of which resists blackening is stable to atmospheric influences and contains over 50% of silica and less than 30% of boric oxide.

Figure 1:
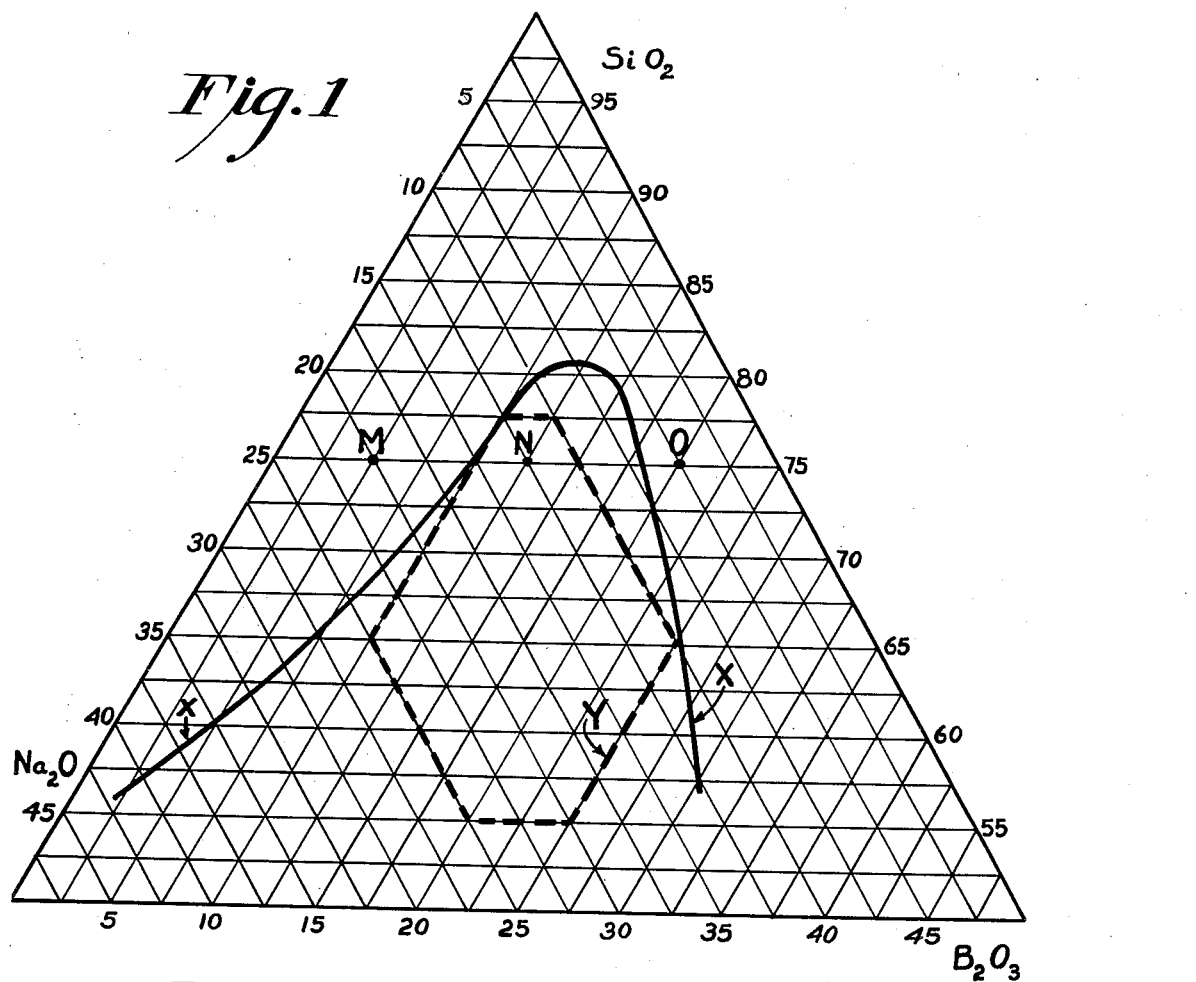
Figure 2:
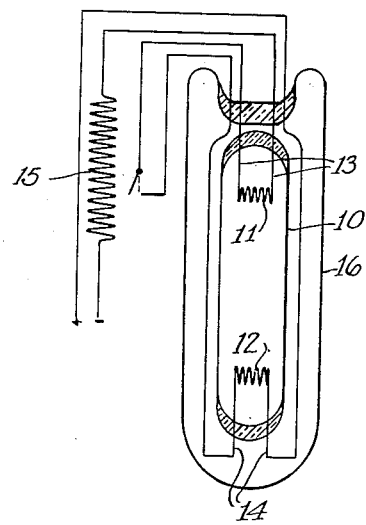

My invention will be better understood when considered in connection with the accompanying drawing, in which:

Fig. 1 is a triaxial diagram illustrating the ternary system $Na_2O$—$B_2O_3$—$SiO_2$; and Fig. 2 is a cross-sectional diagram of a sodium vapor lamp made in accordance with my invention.

In Fig. 1 the area enclosed by the solid curved line X represents as closely as possible the field of glass compositions which are within the broader limits and scope of the present invention although it is to be understood that the property of resistance to blackening is not thus sharply delineated but is greatest near the center of the field and decreases gradually towards the borders thereof. Therefore the field thus outlined includes all of the glasses of this system which resist blackening sufficiently well and are at the same time sufficiently stable to atmospheric influences to be suitable for my purpose. Glass compositions which are outside of the field represented by the line X are not suitable and discolor badly when exposed to hot alkali metal vapors as in a sodium vapor lamp. For example, considering the glass compositions represented by the points M, N and O, the composition N resists blackening very well but the compositions M and O discolor badly when exposed to hot alkali metal vapors as in a sodium vapor lamp. It will be noted that the glass compositions falling within the boundaries of the field enclosed by the line X may be defined in terms of percentage composition by the following limits: $SiO_2$ between 55% and 80% and $B_2O_3$ greater than the amount represented by the expression $$\frac{60 - \%Na_2O}{4.5}$$

but less than 2.57 times the percentage of $Na_2O$.

The area enclosed by the dotted line Y illustrates the preferred embodiment of my invention and represents those glass compositions which are particularly desirable as regards resistance to blackening, stability to atmospheric influences and expansion coefficient. The boundaries of this area are expressed in terms of percentage composition as follows: $SiO_2$ between 55% and 77%, $B_2O_3$ between 10% and 25% and $Na_2O$ between 10% and 25%.

The following are examples of glass compositions which I have made and which fall within the scope of my invention.

|  | A | B | C | D | E | F | G | H | I |
|---|---|---|---|---|---|---|---|---|---|
| $SiO_2$ | 67 | 75 | 60 | 60 | 78 | 62 | 65 | 64.5 | 65 |
| $Na_2O$ | 19 | 12 | 25 | 14 | 7 | 13 | 11 | 11 | 17 |
| $B_2O_3$ | 14 | 13 | 15 | 26 | 14 | 15 | 16 | 15 | 10 |
| $Al_2O_3$ |  |  |  |  | 1 |  |  | 5.5 |  |
| CaO |  |  |  |  |  | 10 |  |  |  |
| MgO |  |  |  |  |  |  | 8 |  |  |
| BeO |  |  |  |  |  |  |  | 4 |  |
| BaO |  |  |  |  |  |  |  |  | 8 |
| Expansion $x10^{-7}$ | 89 | 65 | 98 | 71 | 49 | 83 | 69 | 67 | 89 |

The above glasses show satisfactory results when subjected to an accelerated test comprising exposure to alkali metal vapors at 275° C. for 48 hours. Furthermore, they are not affected by ordinary atmospheric influences and have a relatively wide range of expansion coefficients as shown. The glasses A, B, C, and D are simple borosilicates; E is a borosilicate containing alumina; and F, G, H, and I are borosilicates containing the alkaline earths. By the term "alkaline earths" as used herein, I mean to include beryllium, magnesium, calcium, strontium, and barium. I have found that the alkaline earth oxides may be incorporated in the glasses of the ternary system $Na_2O$—$B_2O_3$—$SiO_2$ without deleterious effect on their resistance to blackening provided that the silica content is kept below 80%; that the alkaline earth oxides are considered as substitutions for boric oxide; that the boric oxide percentage is greater than four and one-half divided into sixty minus the percentage of sodium oxide and that the sum of the boric oxide and the alkaline earth oxide percentages does not exceed 2.57 times the percentage of sodium oxide. The use of zinc oxide is to be avoided since it is easily reduced and will cause blackening when the glass is subjected to the action of hot alkali metal vapors. Alumina in small amounts seems to be slightly beneficial as regards resistance to blackening but easily reduceable metallic oxides are objectionable. Arsenic in the amounts usually used for fining is not objectionable. Potash may be substituted for soda in amounts up to about 50% of the total alkali content without appreciable effect upon the resistance to blackening but in amounts greater than this it produces glasses which are slightly inferior to those containing soda alone. Lithia is objectionable because it produces blackening.

In Fig. 2 I have illustrated as an example of my invention a sodium vapor lamp comprising a sealed and evacuated tube 10 containing sodium and having electrodes 11 and 12, in this instance of the type known as the hot cathode, located inside and adjacent the ends of the tube 10. To the electrodes are attached sealed-in electrode supports 13 and 14 which communicate with the line current. A suitable resistance 15 is inserted in the line for controlling the power in-put.

In practicing my invention the batch according to the above description is melted and the resulting glass is fabricated to form the tube 10 in the manner known in the art. Likewise in known manner the lead wires bearing electrodes are sealed into the ends thereof, the tube is evacuated, metallic sodium is introduced therein and the tube is sealed. In addition to the sodium I may also introduce into the tube 10 for the purpose of modifying the spectral characteristics of the light produced by the lamp a small amount of one or more of the noble gases or of mercury or of other alkali metals such as potassium. If desired an outer glass envelope 16 may be provided which encloses the tube 10 and forms a sealed and evacuated chamber there-around for the purpose of conserving the heat of the arc since better efficiency of the arc may thus be obtained.

Although in the foregoing I have shown and described one type of sodium vapor lamp, it is to be understood that I do not desire to be limited thereby but that any glass envelope for containing hot alkali vapors and composed of any glass composition falling within the area bounded by the curve X (Fig. 1) will fall within the broader limits and scope of my invention as claimed.

What I claim is:

1. A glass envelope containing alkali metal vapors the glass of which is a borosilicate glass in which the silica content is between 55% and 80% and the boric oxide percentage is greater than 4.5 divided into 60 minus the percentage of alkali oxide but is less than 2.57 times the percentage of alkali oxide.

2. A glass envelope containing alkali metal vapors the glass of which is an alkaline earth borosilicate glass in which the silica content is between 55% and 80%, the percentage of boric oxide is greater than 4.5 divided into 60 minus the percentage of alkali oxide and the sum of the percentages of boric oxide and alkaline earth oxide is less than 2.57 times the percentage of alkali oxide.

3. A glass envelope containing alkali metal vapors the glass of which is a borosilicate glass the composition of which includes 55% to 77% silica, 10% to 25% boric oxide and 10% to 25% alkali oxide.

4. A glass envelope containing alkali metal vapors the glass of which is a borosilicate glass containing 55% to 77% silica, 10% to 25% boric oxide, 10% to 25% alkali oxide and an alkaline earth oxide.

5. A lamp comprising an envelope containing alkali metal vapors and electrodes, at least a portion of said envelope being composed of borosilicate glass in which the silica content is between 55% and 80% and the boric oxide percentage is greater than 4.5 divided into 60 minus the percentage of alkali oxide but is less than 2.57 times the percentage of alkali oxide.

6. A lamp comprising an envelope containing alkali metal vapors and electrodes, at least a portion of said envelope being composed of an alkaline earth borosilicate glass in which the silica content is between 55% and 80%, the percentage of boric oxide is greater than 4.5 divided into 60 minus the percentage of alkali oxide and the sum of the percentages of boric oxide and alkaline earth oxide is less than 2.57 times the percentage of alkali oxide.

7. A lamp comprising an envelope containing alkali metal vapors and electrodes, said envelope being composed of a borosilicate glass the composition of which includes 55% to 77% silica, 10% to 25% boric oxide and 10% to 25% alkali oxide.

8. A lamp comprising an envelope containing alkali metal vapors and electrodes, said envelope being composed of a borosilicate glass containing 55% to 77% silica, 10% to 25% boric oxide, 10% to 25% alkali oxide and an alkaline earth oxide.

9. A lamp comprising an envelope containing alkali metal vapors, electrodes and electrode supports, the envelope being composed of borosilicate glass in which the silica content is between 55% and 80% and the boric oxide percentage is greater than 4.5 divided into 60 minus the percentage of alkali oxide but is less than 2.57 times the percentage of alkali oxide.

10. A lamp comprising an envelope containing alkali metal vapors, electrodes and electrode supports, the envelope being composed of an alkaline earth borosilicate glass in which the silica content is between 55% and 80%, the percentage of boric oxide is greater than 4.5 divided into 60 minus the percentage of alkali oxide and the sum of the percentages of boric oxide and alkaline earth oxide is less than 2.57 times the percentage of alkali oxide.

11. A lamp comprising an envelope containing alkali metal vapors, electrodes and electrode supports, the envelope being composed of a borosilicate glass the composition of which includes 55% to 77% silica, 10% to 25% boric oxide and 10% to 25% alkali oxide.

12. A lamp comprising an envelope containing alkali metal vapors, electrodes and electrode supports, the envelope being composed of a borosilicate glass containing 55% to 77% silica, 10% to 25% boric oxide, 10% to 25% alkali oxide and an alkaline earth oxide.

HARRISON P. HOOD.